US008670743B2

(12) United States Patent
Wang

(10) Patent No.: US 8,670,743 B2
(45) Date of Patent: Mar. 11, 2014

(54) WARNING MESSAGE TRANSMISSION METHOD AND APPARATUS

(75) Inventor: Yi Wang, Shenzhen (CN)

(73) Assignee: ZTE Corporation, Shenzhen (CN)

(*) Notice: Subject to any disclaimer, the term of this patent is extended or adjusted under 35 U.S.C. 154(b) by 189 days.

(21) Appl. No.: 13/386,363

(22) PCT Filed: Mar. 24, 2010

(86) PCT No.: PCT/CN2010/071264
§ 371 (c)(1),
(2), (4) Date: Jan. 20, 2012

(87) PCT Pub. No.: WO2011/017923
PCT Pub. Date: Feb. 17, 2011

(65) Prior Publication Data
US 2012/0269118 A1 Oct. 25, 2012

(30) Foreign Application Priority Data
Aug. 12, 2009 (CN) .......................... 2009 1 0165637

(51) Int. Cl.
H04W 4/22 (2009.01)
H04H 20/59 (2008.01)
H04M 11/04 (2006.01)

(52) U.S. Cl.
USPC ............... 455/404.1; 455/404.2; 455/500; 370/312

(58) Field of Classification Search
USPC ............... 370/256, 312, 335, 465; 455/404.1, 455/404.2, 500
See application file for complete search history.

(56) References Cited

U.S. PATENT DOCUMENTS

| 2003/0174678 A1* | 9/2003 | Chang et al. ............ 370/335 |
| 2009/0227224 A1* | 9/2009 | Aftelak et al. ........... 455/404.2 |
| 2010/0279692 A1* | 11/2010 | Hapsari et al. ........... 455/436 |
| 2011/0151828 A1* | 6/2011 | Gou et al. ............... 455/404.1 |
| 2012/0094676 A1* | 4/2012 | Hapsari et al. ........... 455/440 |

FOREIGN PATENT DOCUMENTS

| CN | 1735233 | 2/2006 |
| JP | 2003273925 | 9/2003 |
| WO | 2005119969 A1 | 12/2005 |

OTHER PUBLICATIONS

ETSI TS 129 168 V9.0.0, Universal Mobile Telecommunications System (UMTS); LTE; Cell Broadcast Centre interfaces with the Evolved Packet Core; Stage 3.*

(Continued)

Primary Examiner — Andrew Chriss
Assistant Examiner — John Lequang
(74) Attorney, Agent, or Firm — Kunzler Law Group

(57) ABSTRACT

The present invention provides a warning message transmission method and apparatus after the warning message transmission procedure is completed. The method comprises: after sending a WRITE-REPLACE WARNING REQUEST message to an eNB and receiving a WRITE-REPLACE WARNING RESPONSE message corresponding to the WRITE-REPLACE WARNING REQUEST message and returned by the eNB, a mobility management entity (MME) determining areas where warning broadcast fails based on the WRITE-REPLACE WARNING RESPONSE message corresponding to the WRITE-REPLACE WARNING REQUEST message and returned by the eNB, and then controlling the eNB to resend a warning message to the areas where warning broadcast fails. The present invention can ensure that disastrous information associated with the ETWS can be timely and effectively notified to all users in areas where broadcast fails so as send an escape or precaution warning to them to further minimize huge losses of human life and property when the disaster comes.

16 Claims, 3 Drawing Sheets

(56) References Cited

OTHER PUBLICATIONS

ETSI TS 129 168 V8.0.0, Universal Mobile Telecommunications System (UMTS); LTE; Cell Broadcast Centre interfaces with the Evolved Packet Core; Stage 3.*

PCT/CN2010/071264 International Search Report, Jul. 1, 2010.

LTE, Evolved Universal Terrestrial Radio Access (E-UTRA) ;S1 Application Protocol (S1AP)(3GPP TS 36.413 version 8.4.0 Release 8), Jan. 2009.

* cited by examiner

WARNING MESSAGE TRANSMISSION METHOD AND APPARATUS

FIELD OF THE INVENTION

The present invention relates to the field of mobile communication, and more particularly, to a warning message transmission method and apparatus in a mobility management entity (MME) in the long term evolution (LTE) system.

BACKGROUND

In the long term evolution (LTE) system, according to practical situations, a MME might initiate Warning Message Transmission Procedures to an evolved nodeB (eNodeB, eNB) that needs to send a warning message and has established a Si (an interface connecting the MME and the evolved NodeB (eNodeB) in the LTE system) connection with the MME itself so as to notify the eNB to broadcast the warning message to User Equipments (UEs) residing in a relevant area to which the eNB belongs. The warning message mentioned here specifically refers to catastrophic information associated with the earthquake and tsunami warning system (ETWS). Processing of WS information has features of high importance and high timeliness, so as to inform the people in the relevant area timely and effectively to escape before the disaster comes.

According to the description in the 36.413 protocol, a warning message transmission procedure here as shown in FIG. 1 comprises: when there is ETWS related information required to be sent, a MME sends a WRITE-REPLACE WARNING REQUEST message, which contains warning areas in which the eNB is required to broadcast the ETWS information and specific content of the ETWS information, to an eNB. After the eNB completes the processing, it returns a WRITE-REPLACE WARNING RESPONSE message containing a list of areas where broadcast of an information element (IE) with selectable attributes is completed to the MME. It is stated in the 36.413 protocol that if there is no list of areas where broadcast of the IE is completed in the WRITE-REPLACE WARNING RESPONSE message returned by the eNB to the MME, the MME believes that broadcast of the ETWS information in the required warning areas fails. Likewise, if the range indicated by the list of areas, where broadcast of the IE is completed, contained in the WRITE-REPLACE WARNING RESPONSE message returned by the eNB to the MME is smaller than a warning area, where the IE needs to broadcast the ETWS information, contained in the WRITE-REPLACE WARNING REQUEST message returned by the MME to the eNB, the MME believes that broadcast of the ETWS information in the required warning areas fails partially.

Although the 36.413 protocol describes the scenario where broadcast of the ETWS information fails entirely or partially at the MME side, it does not describe the processing after failure. It can be considered that if the MME has known that broadcast of the ETWS information has failed, but it laissez faire without further processing, the ETWS information cannot be timely and effectively notified to all users within areas where broadcast fails such that escape or precaution warnings cannot be sent to the users, thereby going against minimizing huge losses of human life and property when the disaster comes.

SUMMARY

A technical problem to be solved by the present invention is to provide a warning message transmission method and apparatus so as to overcome the shortcoming in the existing technology that after a warning message transmission process is completed, that is, when a MME receives a WRITE-REPLACE WARNING RESPONSE message returned by an eNB and there is an area where broadcast of ETWS information fails, the MME does not timely and effectively process the area where broadcast of the ETWS information fails as well as the ETWS information such that the ETWS information cannot be timely and effectively notified to all users in the area where broadcast of ETWS information fails and escape or precaution warnings cannot be further sent to them.

In order to solve the aforementioned technical problem, the present invention provides a warning message transmission method comprising:

after sending a WRITE-REPLACE WARNING REQUEST message to an evolved NodeB (eNB) and receiving a WRITE-REPLACE WARNING RESPONSE message corresponding to the WRITE-REPLACE WARNING REQUEST message and returned by the eNB, a mobility management entity (MME) determining areas where warning broadcast fails based on the WRITE-REPLACE WARNING RESPONSE message corresponding to the WRITE-REPLACE WARNING REQUEST message and returned by the eNB, and then controlling the eNB to resend a warning message to the areas where warning broadcast fails, so as to resend the warning message to the area where warning broadcast fails after the warning message transmission procedure is completed.

In the determination step, if it is determined that the WRITE-REPLACE WARNING RESPONSE message does not contain a list of areas where broadcast is completed, it is believed that warning broadcasts within all warning broadcast areas indicated in the WRITE-REPLACE WARNING REQUEST message corresponding to the WRITE-REPLACE WARNING RESPONSE message fail.

In the determination step, if it is determined that the WRITE-REPLACE WARNING RESPONSE message contains a list of areas where broadcast is completed, the list of areas where broadcast is completed carried in the WRITE-REPLACE WARNING RESPONSE message is compared with the warning broadcast areas carried in the WRITE-REPLACE WARNING REQUEST message corresponding to the WRITE-REPLACE WARNING RESPONSE message so as to determine the areas where warning broadcast fails The step of the MME controlling the eNB to resend the warning message to the areas where warning broadcast fails comprises: the MME using the determined areas where warning broadcast fails as new warning broadcast areas, reestablishing a WRITE-REPLACE WARNING REQUEST message and sending the reestablished WRITE-REPLACE WARNING REQUEST message to the eNB.

The step of reestablishing the WRITE-REPLACE WARNING REQUEST message at least comprises filling in the broadcast areas in the reestablished WRITE-REPLACE WARNING REQUEST message with the determined areas where warning broadcast fails, and filling in warning message content in the reestablished WRITE-REPLACE WARNING REQUEST message with warning message content in the last sent WRITE-REPLACE WARNING REQUEST message.

In order to solve the aforementioned technical problem, the present invention provides an apparatus for processing warning message transmission comprising a determination module and a control processing module, wherein:

the determination module is configured to: after a Mobility Management Entity (MME) receives a WRITE-REPLACE WARNING RESPONSE message returned by an evolved NodeB (eNB), determine areas where warning broadcast fails based on the WRITE-REPLACE WARNING RESPONSE message, if determining that there are the areas where warning broadcast fails, notify the control processing module of the areas where warning broadcast fails; and the control processing module is configured to: after knowing the areas where warning broadcast fails, control the MME to use the areas where warning broadcast fails as new warning broadcast areas, reestablish a WRITE-REPLACE WARNING REQUEST message, and send the reestablished WRITE-REPLACE WARNING REQUEST message to the eNB.

The determination module is further configured to: if determining that the WRITE-REPLACE WARNING RESPONSE message does not contain a list of areas where broadcast is completed, believe that warning broadcasts within all warning broadcast areas indicated in the WRITE-REPLACE WARNING REQUEST message corresponding to the WRITE-REPLACE WARNING RESPONSE message fail.

The determination module is further configured to: if determining that the WRITE-REPLACE WARNING RESPONSE message contains the list of areas where broadcast is completed, compare the list of areas where broadcast is completed carried in the WRITE-REPLACE WARNING RESPONSE message with the warning broadcast areas carried in the WRITE-REPLACE WARNING REQUEST message corresponding to the WRITE-REPLACE WARNING RESPONSE message so as to determine the areas where warning broadcast fails.

The control processing module is further configured to: when controlling the MME to reestablish the WRITE-REPLACE WARNING REQUEST message, at least control the MME to fill in the broadcast areas in the reestablished WRITE-REPLACE WARNING REQUEST message with the determined areas where warning broadcast fails, and fill in warning message content in the reestablished WRITE-REPLACE WARNING REQUEST message with warning message content in the last sent WRITE-REPLACE WARNING REQUEST message.

In order to solve the aforementioned technical problem, the present invention also provides a determination module (301) for processing warning message transmission, which is configured to:

after a Mobility Management Entity (MME) receives a WRITE-REPLACE WARNING RESPONSE message returned by an evolved NodeB (eNB), determine areas where warning broadcast fails based on the WRITE-REPLACE WARNING RESPONSE message; and if determining that there are the areas where warning broadcast fails, notify a control processing module (302) for processing warning message transmission of information of the areas where warning broadcast fails such that the control processing module (302) can control the MME to use the areas where warning broadcast fails as new warning broadcast areas after knowing the areas where warning broadcast fails, reestablish a WRITE-REPLACE WARNING REQUEST message, and send the reestablished WRITE-REPLACE WARNING REQUEST message to the eNB.

The determination module (301) is further configured to: if determining that the WRITE-REPLACE WARNING RESPONSE message does not contain a list of areas where broadcast is completed, believe that warning broadcasts within all warning broadcast areas indicated in the WRITE-REPLACE WARNING REQUEST message corresponding to the WRITE-REPLACE WARNING RESPONSE message fail.

The determination module (301) is further configured to: if determining that the WRITE-REPLACE WARNING RESPONSE message contains the list of areas where broadcast is completed, compare the list of areas where broadcast is completed carried in the WRITE-REPLACE WARNING RESPONSE message with the warning broadcast areas carried in the WRITE-REPLACE WARNING REQUEST message corresponding to the WRITE-REPLACE WARNING RESPONSE message so as to determine the areas where warning broadcast fails.

In order to solve the aforementioned technical problem, the present invention also provides a control processing module (302) for processing warning message transmission, which is configured to:

after a determination module (301) for processing warning message transmission knows areas where warning broadcast fails, control a mobility management entity (MME) to use the areas where warning broadcast fails as new warning broadcast areas, reestablish a WRITE-REPLACE WARNING REQUEST message and send the reestablished WRITE-REPLACE WARNING REQUEST message to an evolved NodeB (eNB);

wherein after the MME receives a WRITE-REPLACE WARNING RESPONSE message returned by the eNB, the determination module (301) determines the areas where warning broadcast fails based on the WRITE-REPLACE WARNING RESPONSE message, and if determining that there are the areas where warning broadcast fails, notifies the control processing module (302) of information of the areas where warning broadcast fails;

so as to resend a warning message to the areas where warning broadcast fails after a warning message transmission procedure is completed.

The control processing module (302) is further configured to: when controlling the MME to reestablish the WRITE-REPLACE WARNING REQUEST message, at least control the MME to fill in the broadcast areas in the WRITE-REPLACE WARNING REQUEST message with the determined areas where warning broadcast fails, and fill in warning message content in the reestablished WRITE-REPLACE WARNING REQUEST message with warning message content in the last sent WRITE-REPLACE WARNING REQUEST message

DETAILED DESCRIPTION

An embodiment of the present invention provides a processing method and apparatus after an ETWS warning message transmission process is completed so as to ensure that the ETWS information can be informed to the users in a timely and effective manner and the losses of human life and property can be minimized when the disaster comes, thus it has great significance.

The present invention will be described in detail in conjunction with FIG. 2 and the specific embodiments.

Suppose that there are three areas, namely A, B and C, in an eNB. A MME sends a WRITE-REPLACE WARNING REQUEST message, which specifically refers to disastrous information associated with the ETWS, to the eNB. The WRITE-REPLACE WARNING REQUEST message at least carries warning broadcast areas and warning content, wherein the warning broadcast areas are areas where the MME require the eNB to broadcast the ETWS message. Here, assume that the warning broadcast areas are all of the cells. i.e., cells A, B and C, in the eNB, and assume that the warning message content carried in the WRITE-REPLACE WARNING REQUEST message is P, which will be taken as example to illustrate the technical scheme of the present invention.

Figure 1:
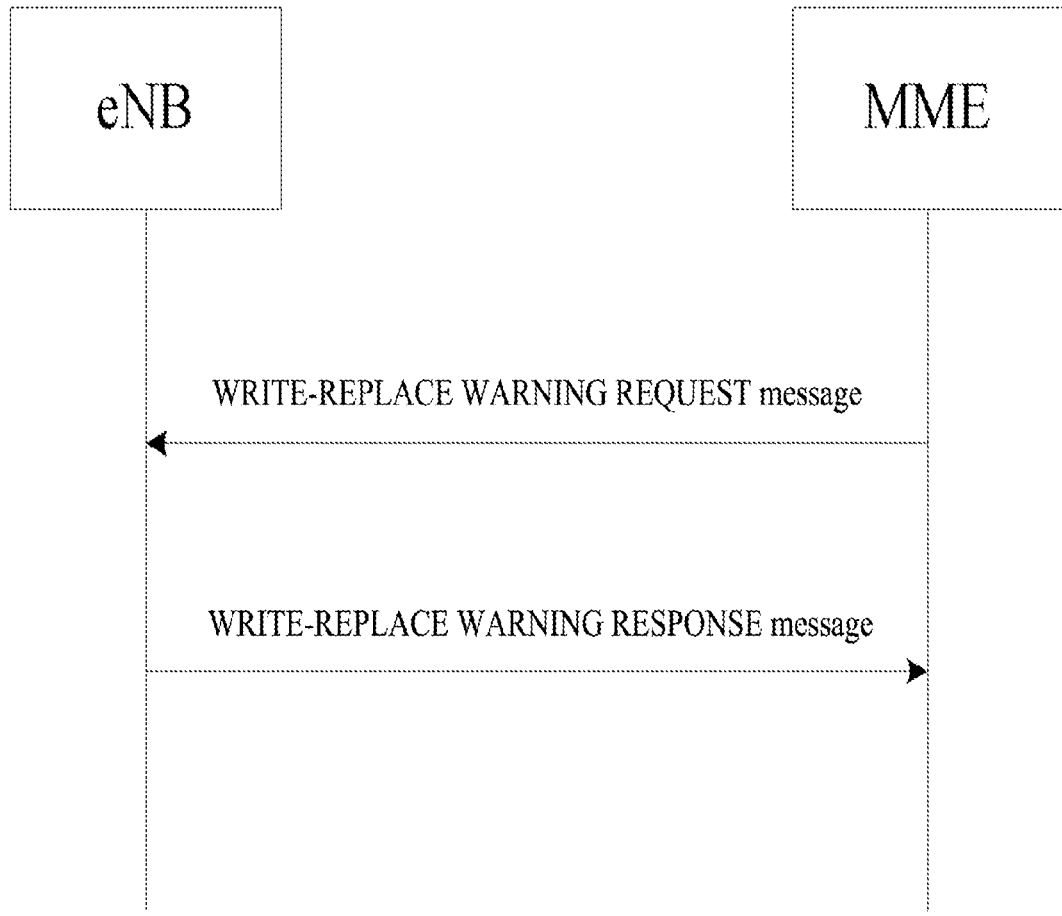
FIG. 1 is a timing diagram of message exchange in a warning message transmission process.
Figure 2:
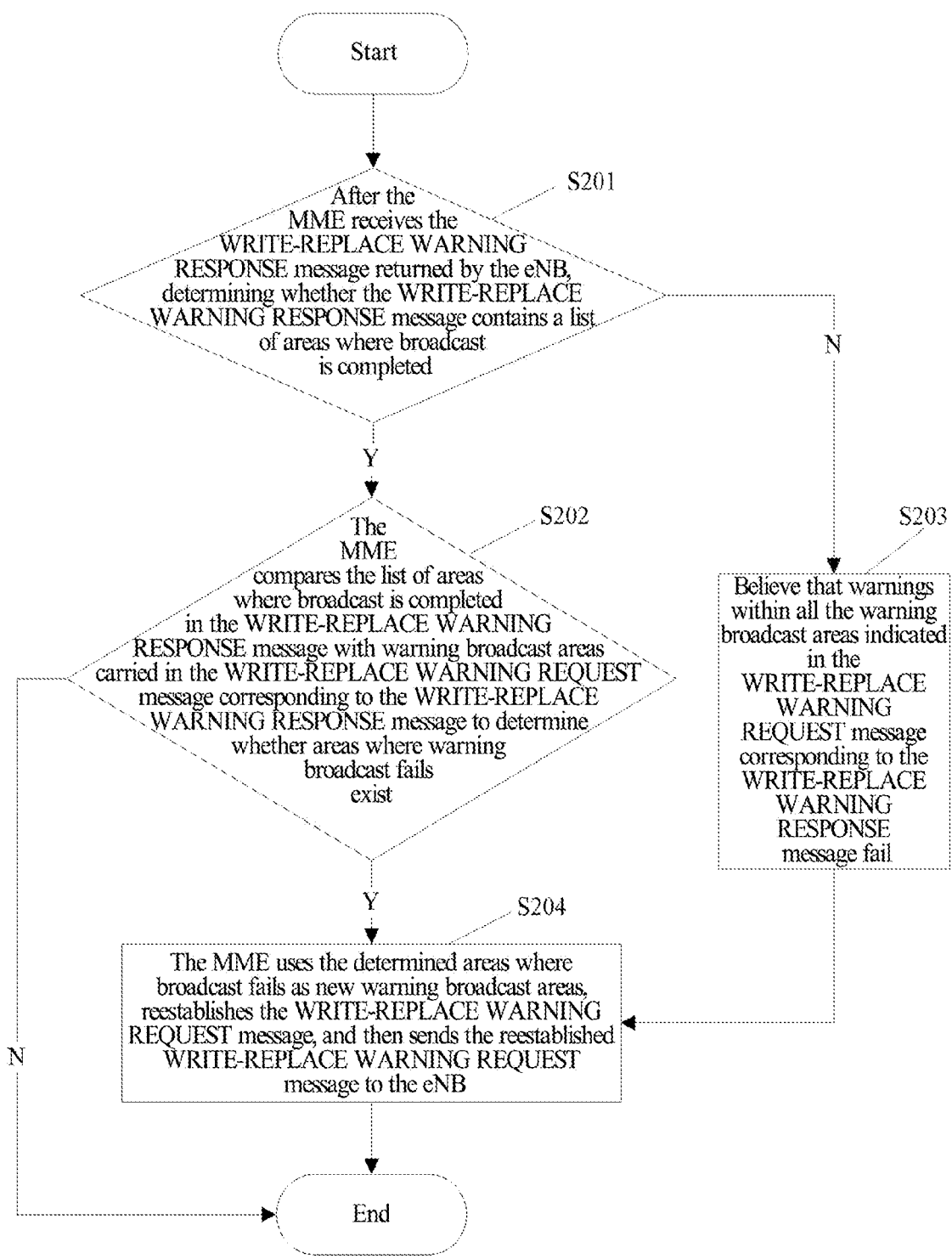
FIG. 2 is a flow chart of a processing method of a MME after a warning message transmission process is completed in accordance with an embodiment of the present invention.

Referring to FIG. 2 hereinafter, a corresponding processing procedure after the MME sends the WRITE-REPLACE WARNING REQUEST message to the eNB in accordance with an embodiment of the present invention is shown, and specifically comprises the following steps.

Step S201: after the MME receives the WRITE-REPLACE WARNING RESPONSE message returned by the eNB, it determines whether the WRITE-REPLACE WARNING RESPONSE message contains a list of areas where broadcast is completed, and if yes, the procedure proceeds to step S202; otherwise, the procedure proceeds to step S203.

Step S202: the MME compares the list of areas where broadcast is completed in the WRITE-REPLACE WARNING RESPONSE message with the warning broadcast areas carried in the WRITE-REPLACE WARNING REQUEST message corresponding to the WRITE-REPLACE WARNING RESPONSE message to determine the areas where warning broadcast fails, if there is no area where warning broadcast fails, the procedure ends; otherwise, after the areas where warning broadcast fails are determined, the procedure proceeds to step S204.

For example, when the list of areas where broadcast is completed carried in the WRITE-REPLACE WARNING RESPONSE message contains cells A and B, since the warning broadcast areas carried in the WRITE-REPLACE WARNING REQUEST message corresponding to the WRITE-REPLACE WARNING RESPONSE message are cells A, B and C, it is determined that the area where warning broadcast fails is cell C, which is the case that broadcast of the warning message fails partially, and then step S204 is performed.

Step S203: it is determined that warnings within all the warning broadcast areas indicated in the WRITE-REPLACE WARNING REQUEST message corresponding to the WRITE-REPLACE WARNING RESPONSE message fail, the areas where warning broadcast fails are cells A, B and C, and the procedure proceeds to step S204.

Step S204: the MME uses the determined areas where broadcast fails as new warning broadcast areas, reestablishes the WRITE-REPLACE WARNING REQUEST message, and then sends the reestablished WRITE-REPLACE WARNING REQUEST message to the Enb.

When the MME reestablishes the WRITE-REPLACE WARNING REQUEST message, it fills in the broadcast areas in the WRITE-REPLACE WARNING REQUEST message as areas where the last broadcast fails, for example, in step S203, if it determines that warning broadcasts within all the areas fail entirely, then it fills in the warning failure areas with cells A, B and C. As another example, in step S202, if it determines that warning broadcasts within all the areas fail partially, then it fills in the warning failure areas with cells where broadcast fails partially; and fills in warning message content in the WRITE-REPLACE WARNING REQUEST message with the same warning message content in the last sent WRITE-REPLACE WARNING REQUEST message. For example, in this embodiment, the content is filled with P; the other signal elements in the WRITE-REPLACE WARNING REQUEST message might be filled in according to the protocol requirements and the practical situations.

Thus, when the eNB receives the reestablished WRITE-REPLACE WARNING REQUEST message sent by the MME, it can pertinently resend the warning message according to the warning broadcast areas, namely areas where the last broadcast fails, in the new WRITE-REPLACE WARNING REQUEST message.

The aforementioned steps S201-S204 can be executed repeatedly until there is no area where warning fails; or a times threshold for repeat sending may be set such that warning is executed after the threshold is exceeded, or other notification and precaution measures are executed so as to send an escape or precaution warning to the people in the warning broadcast areas, thus further minimize huge losses of human life and property when the disaster comes.

Figure 3:
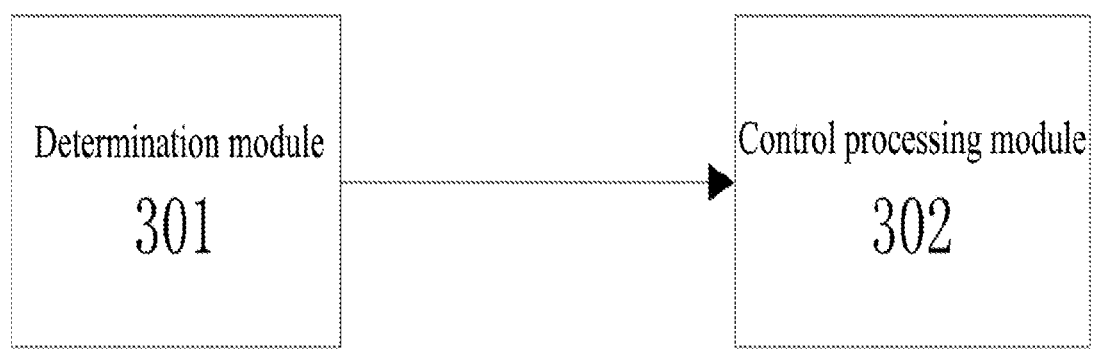
FIG. 3 is a block diagram of a processing apparatus of a MME after a warning message transmission process is completed in accordance with an embodiment of the present invention.

In order to implement the aforementioned method, the present invention also provides an apparatus, as shown in FIG. 3, comprising a determination module 301 and a control processing module 302.

After the Mobility Management Entity (MME) receives a WRITE-REPLACE WARNING RESPONSE message returned by an evolved NodeB (eNB), a determination module 301 determines areas where warning broadcast fails based on the WRITE-REPLACE WARNING RESPONSE message, if it determines that there are areas where warning broadcast fails, it notifies a control processing module 302 of information of the areas where warning broadcast fails;

Furthermore, if the determination module 301 determines that the WRITE-REPLACE WARNING RESPONSE message does not contain a list of areas where broadcast is completed, it believes that warning broadcasts within all warning broadcast areas indicated in the WRITE-REPLACE WARNING REQUEST message corresponding to the WRITE-REPLACE WARNING RESPONSE message fail. If the determination module 301 determines that the WRITE-REPLACE WARNING RESPONSE message contains the list of areas where broadcast is completed, it compares the list of areas where broadcast is completed carried in the WRITE-REPLACE WARNING RESPONSE message with warning broadcast areas carried in the WRITE-REPLACE WARNING REQUEST message corresponding to the WRITE-REPLACE WARNING RESPONSE message to determine the areas where warning broadcast fails.

After knowing the areas where warning broadcast fails, the control processing module 302 controls the MME to use the areas where warning broadcast fails as new warning broadcast areas, reestablishes a WRITE-REPLACE WARNING REQUEST message, and sends the reestablished WRITE-REPLACE WARNING REQUEST message to the eNB.

When the control processing module 302 controls the MME to reestablish the WRITE-REPLACE WARNING REQUEST message, it at least controls the MME to fill in the broadcast areas in the new WRITE-REPLACE WARNING REQUEST message with the determined areas where warning broadcast fails and to fill in warning message content in the new WRITE-REPLACE WARNING REQUEST message with warning message content in the last sent WRITE-REPLACE WARNING REQUEST message.

The present invention may also have other various embodiments where for the description of warning broadcast areas, area where warning broadcast is completed and areas where warning broadcast fails, in addition to the list of areas illustrated in the present embodiment, that is, the areas are described with area identifiers, the list of areas may be a list of tracking areas, that is, the areas are described with the tracking area identifiers, or the areas may be emergency areas, that is, the areas are described with emergency area identifiers. Various corresponding modifications and variations to the present invention may be made by those skilled in the art according to the present invention without departing from the spirit and the substance of the present invention, and these corresponding modifications and variations should all belong to the protection scope of the appended claims of the present invention.

Compared with the existing technology, by determining the content of the WRITE-REPLACE WARNING RESPONSE message returned by the eNB to the MME when the warning message transmission process is completed, that is, determining whether there are areas where broadcast of ETWS information fails, the warning message transmission method and apparatus after the warning message transmission procedure is completed in accordance with the present invention can address the shortcoming that when there are the areas where broadcast of ETWS information fails, the MME resends the WRITE-REPLACE WARNING RESPONSE message of ETWS information regarding the broadcast failure to the eNB for the areas where broadcast fails, that is, the technical measures of reinitiating the warning message transmission procedures such that when there are areas where broadcast fails in the warning message transmission procedures, the ETWS information cannot be timely and effectively notified to users in areas where broadcast fails. Therefore, an escape or precaution warning can be sent to them to further minimize the huge losses of human life and property when the disaster comes.

What is claimed is:

1. A warning message transmission method comprising:
after sending a WRITE-REPLACE WARNING REQUEST message to an evolved NodeB (eNB) and receiving a WRITE-REPLACE WARNING RESPONSE message corresponding to the WRITE-REPLACE WARNING REQUEST message and returned by the eNB, a mobility management entity (MME) determining areas where warning broadcast fails based on the WRITE-REPLACE WARNING RESPONSE message corresponding to the WRITE-REPLACE WARNING REQUEST message and returned by the eNB, and then controlling the eNB to resend a warning message to the areas where warning broadcast fails, so as to resend the warning message to the area where warning broadcast fails after the warning message transmission procedure is completed.

2. The method according to claim 1, wherein
in the determination step, if it is determined that the WRITE-REPLACE WARNING RESPONSE message does not contain a list of areas where broadcast is completed, it is believed that warning broadcasts within all warning broadcast areas indicated in the WRITE-REPLACE WARNING REQUEST message corresponding to the WRITE-REPLACE WARNING RESPONSE message fail.

3. The method according to claim 1, wherein
in the determination step, if it is determined that the WRITE-REPLACE WARNING RESPONSE message contains a list of areas where broadcast is completed, the list of areas where broadcast is completed carried in the WRITE-REPLACE WARNING RESPONSE message is compared with the warning broadcast areas carried in the WRITE-REPLACE WARNING REQUEST message corresponding to the WRITE-REPLACE WARNING RESPONSE message so as to determine the areas where warning broadcast fails.

4. The method according to claim 1, wherein
the step of the MME controlling the eNB to resend the warning message to the areas where warning broadcast fails comprises: the MME using the determined areas where warning broadcast fails as new warning broadcast areas, reestablishing a WRITE-REPLACE WARNING REQUEST message and sending the reestablished WRITE-REPLACE WARNING REQUEST message to the eNB.

5. The method according to claim 4, wherein
the step of reestablishing the WRITE-REPLACE WARNING REQUEST message at least comprises filling in the broadcast areas in the reestablished WRITE-REPLACE WARNING REQUEST message with the determined areas where warning broadcast fails, and filling in warning message content in the reestablished WRITE-REPLACE WARNING REQUEST message with warning message content in the last sent WRITE-REPLACE WARNING REQUEST message.

6. An apparatus for processing warning message transmission comprising a determination module (301) and a control processing module (302), wherein:
the determination module (301) is configured to: after a Mobility Management Entity (MME) receives a WRITE-REPLACE WARNING RESPONSE message returned by an evolved NodeB (eNB), determine areas where warning broadcast fails based on the WRITE-REPLACE WARNING RESPONSE message, and if determining that there are the areas where warning broadcast fails, notify the control processing module of the areas where warning broadcast fails; and
the control processing module (302) is configured to: after knowing the areas where warning broadcast fails, control the MME to use the areas where warning broadcast fails as new warning broadcast areas, reestablish a WRITE-REPLACE WARNING REQUEST message, and send the reestablished WRITE-REPLACE WARNING REQUEST message to the eNB, so as to resend a warning message to the areas where warning broadcast fails after a warning message transmission procedure is completed.

7. The apparatus according to claim 6, wherein the determination module (301) is further configured to:
if determining that the WRITE-REPLACE WARNING RESPONSE message does not contain a list of areas where broadcast is completed, believe that warning broadcasts within all warning broadcast areas indicated in the WRITE-REPLACE WARNING REQUEST message corresponding to the WRITE-REPLACE WARNING RESPONSE message fail.

8. The apparatus according to claim 6, wherein the determination module (301) is further configured to:
if determining that the WRITE-REPLACE WARNING RESPONSE message contains the list of areas where broadcast is completed, compare the list of areas where broadcast is completed carried in the WRITE-REPLACE WARNING RESPONSE message with the warning broadcast areas carried in the WRITE-REPLACE WARNING REQUEST message corresponding to the WRITE-REPLACE WARNING RESPONSE message so as to determine the areas where warning broadcast fails.

9. The apparatus according to claim 6, wherein the control processing module (302) is further configured to:
when controlling the MME to reestablish the WRITE-REPLACE WARNING REQUEST message, at least control the MME to fill in the broadcast areas in the reestablished WRITE-REPLACE WARNING REQUEST message with the determined areas where warning broadcast fails, and fill in warning message content in the reestablished WRITE-REPLACE WARNING REQUEST message with warning message content in the last sent WRITE-REPLACE WARNING REQUEST message.

10. A determination module (301) for processing warning message transmission, which is configured to:

after a Mobility Management Entity (MME) receives a WRITE-REPLACE WARNING RESPONSE message returned by an evolved NodeB (eNB), determine areas where warning broadcast fails based on the WRITE-REPLACE WARNING RESPONSE message; and if determining that there are the areas where warning broadcast fails, notify a control processing module (302) for processing warning message transmission of information of the areas where warning broadcast fails such that the control processing module (302) can control the MME to use the areas where warning broadcast fails as new warning broadcast areas after knowing the areas where warning broadcast fails, reestablish a WRITE-REPLACE WARNING REQUEST message, and send the reestablished WRITE-REPLACE WARNING REQUEST message to the eNB.

11. The determination module (301) according to claim 10, wherein the determination module (301) is further configured to:

if determining that the WRITE-REPLACE WARNING RESPONSE message does not contain a list of areas where broadcast is completed, believe that warning broadcasts within all warning broadcast areas indicated in the WRITE-REPLACE WARNING REQUEST message corresponding to the WRITE-REPLACE WARNING RESPONSE message fail.

12. The determination module (301) according to claim 10, wherein the determination module (301) is further configured to:

if determining that the WRITE-REPLACE WARNING RESPONSE message contains the list of areas where broadcast is completed, compare the list of areas where broadcast is completed carried in the WRITE-REPLACE WARNING RESPONSE message with the warning broadcast areas carried in the WRITE-REPLACE WARNING REQUEST message corresponding to the WRITE-REPLACE WARNING RESPONSE message so as to determine the areas where warning broadcast fails.

13. The method according to claim 2, wherein the step of the MME controlling the eNB to resend the warning message to the areas where warning broadcast fails comprises: the MME using the determined areas where warning broadcast fails as new warning broadcast areas, reestablishing a WRITE-REPLACE WARNING REQUEST message and sending the reestablished WRITE-REPLACE WARNING REQUEST message to the eNB.

14. The method according to claim 3, wherein the step of the MME controlling the eNB to resend the warning message to the areas where warning broadcast fails comprises: the MME using the determined areas where warning broadcast fails as new warning broadcast areas, reestablishing a WRITE-REPLACE WARNING REQUEST message and sending the reestablished WRITE-REPLACE WARNING REQUEST message to the eNB.

15. The apparatus according to claim 7, wherein the control processing module (302) is further configured to:

when controlling the MME to reestablish the WRITE-REPLACE WARNING REQUEST message, at least control the MME to fill in the broadcast areas in the reestablished WRITE-REPLACE WARNING REQUEST message with the determined areas where warning broadcast fails, and fill in warning message content in the reestablished WRITE-REPLACE WARNING REQUEST message with warning message content in the last sent WRITE-REPLACE WARNING REQUEST message.

16. The apparatus according to claim 8, wherein the control processing module (302) is further configured to:

when controlling the MME to reestablish the WRITE-REPLACE WARNING REQUEST message, at least control the MME to fill in the broadcast areas in the reestablished WRITE-REPLACE WARNING REQUEST message with the determined areas where warning broadcast fails, and fill in warning message content in the reestablished WRITE-REPLACE WARNING REQUEST message with warning message content in the last sent WRITE-REPLACE WARNING REQUEST message.

* * * * *